United States Patent
Sachindran et al.

(10) Patent No.: US 12,314,332 B2
(45) Date of Patent: May 27, 2025

(54) SEARCH SUMMARY GENERATION BASED ON SEARCHER CHARACTERISTICS

(71) Applicant: Microsoft Technology Licensing, LLC, Redmond, WA (US)

(72) Inventors: Santhosh Sachindran, Campbell, CA (US); Raghavan Muthuregunathan, Fremont, CA (US); Jagadeesan Sundaresan, Fremont, CA (US); Chetan Bhole, Mountain View, CA (US); Yi Zhou, Sunnyvale, CA (US); Dhruv Saksena, Sunnvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/369,392

(22) Filed: Sep. 18, 2023

(65) Prior Publication Data

US 2025/0094506 A1 Mar. 20, 2025

(51) Int. Cl.
| | |
|---|---|
| *G06F 16/00* | (2019.01) |
| *G06F 16/9532* | (2019.01) |
| *G06F 16/9535* | (2019.01) |
| *G06F 16/9536* | (2019.01) |
| *G06F 16/957* | (2019.01) |

(52) U.S. Cl.
CPC ...... *G06F 16/9535* (2019.01); *G06F 16/9532* (2019.01); *G06F 16/9536* (2019.01); *G06F 16/9577* (2019.01)

(58) Field of Classification Search
CPC ............. G06F 16/9535; G06F 16/9532; G06F 16/9577; G06F 16/9536
See application file for complete search history.

(56) References Cited

U.S. PATENT DOCUMENTS

| | | | |
|---|---|---|---|
| 9,299,059 B1* | 3/2016 | Marra | G06F 16/9535 |
| 11,030,223 B2* | 6/2021 | Vikramaratne | G06F 16/9535 |
| 11,861,321 B1* | 1/2024 | O'Kelly | G06F 16/33 |
| 11,971,914 B1* | 4/2024 | Watson | G06F 16/3347 |

(Continued)

OTHER PUBLICATIONS

Blood Josh, "How Does Google Determine Search Results Summaries & Menus?", Marketing Messages, Sep. 8, 2023, pp. 1-5.

(Continued)

*Primary Examiner* — Syed H Hasan
(74) *Attorney, Agent, or Firm* — KDW FIRM PLLC

(57) ABSTRACT

Techniques are provided for presenting a summary with search results. One method includes operations for receiving a search query, performing a search based on the search query, and determining, by a machine learning (ML) model, a user intent based on input comprising the search query, user profile information, and activity information of the user. A prompt is generated based on the search query, the user intent, and relationships between the user and entities. The prompt generation comprises selecting a prompt template comprising fields for the user intent, the search query, and the relationships, and filling in the fields. The method further includes operations for feeding as input the prompt to a generative artificial intelligence (GAI) model, receiving a summary from the GAI model, and causing presentation of the summary and one or more results returned by the search on a user interface (UI) of the device of the user.

20 Claims, 10 Drawing Sheets

(56) References Cited

U.S. PATENT DOCUMENTS

| | | | | |
|---|---|---|---|---|
| 12,010,076 | B1* | 6/2024 | Andrew | H04L 51/046 |
| 2014/0280017 | A1* | 9/2014 | Indarapu | G06Q 50/01 |
| | | | | 707/711 |
| 2018/0336457 | A1* | 11/2018 | Pal | G06N 3/045 |
| 2019/0325084 | A1* | 10/2019 | Peng | G06F 9/453 |
| 2020/0034357 | A1* | 1/2020 | Panuganty | G06F 16/24578 |
| 2022/0284479 | A1* | 9/2022 | Sun | G06Q 30/0269 |
| 2024/0129601 | A1* | 4/2024 | Brdiczka | H04N 21/854 |
| 2024/0428275 | A1* | 12/2024 | Luus | G06Q 30/0201 |

OTHER PUBLICATIONS

International Search Report and Written Opinion received for PCT Application No. PCT/US2024/045899, Nov. 22, 2024, 13 pages.

\* cited by examiner

Summary of tax information

The state of California requires you to pay taxes if you are a resident or nonresident that receives income from a California source. The state income tax rates range from 1% to 12.3%, and the sales tax rate is 7.25% to 10.75%. Property taxes in California are capped at 1% of a property's assessed value plus local voter-approved taxes. Assessments can increase by up to 2% annually. Additional taxes and exemptions may apply.

30 posts summarized by ai

Is this summary helpful? 

FIG. 3

SEARCH SUMMARY GENERATION BASED ON SEARCHER CHARACTERISTICS

TECHNICAL FIELD

The subject matter disclosed herein generally relates to methods, systems, and machine-readable storage media for generating quality search results.

BACKGROUND

When performing search queries on an online service, the results may include a large number of documents that may contain different opinions about an issue. It may be challenging for individuals to review every single post or piece of content to gain a comprehensive understanding of the situation, where opinions can vary greatly.

BRIEF DESCRIPTION OF THE DRAWINGS

Various of the appended drawings merely illustrate example embodiments of the present disclosure and cannot be considered as limiting its scope.

FIG. 3 shows a summary with feedback options, according to some example embodiments.

DETAILED DESCRIPTION

Figure 1:
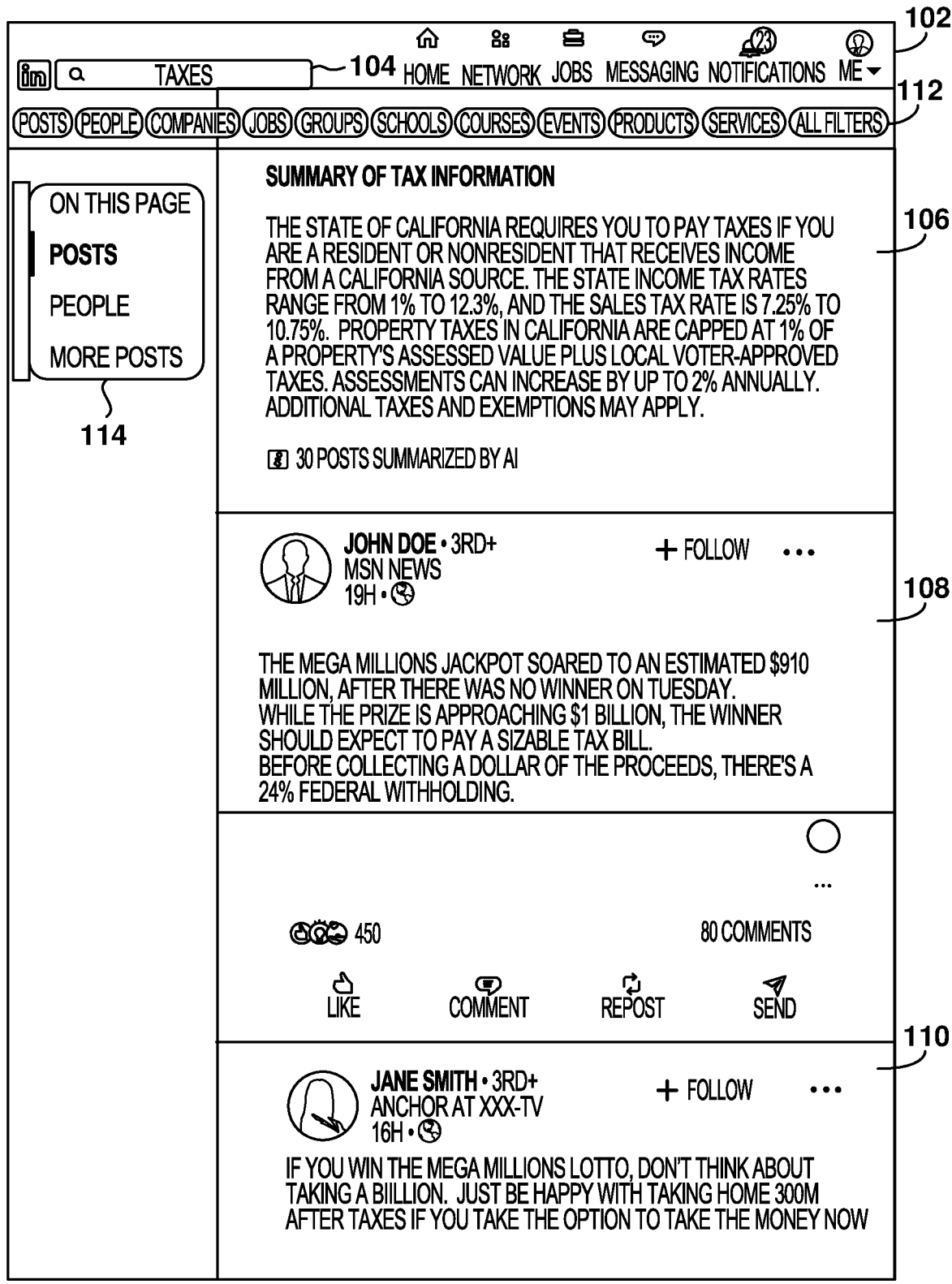
FIG. 1 is a search-results page, according to some example embodiments.

Example methods, systems, and computer programs are directed to presenting a summary with the results of a search. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Systems and methods are presented for generating personalized search results and summaries based on a user's intent and the profile of the user. Many conventional search approaches provide the same results for users, prioritizing results exclusively on the content of the search query while not considering the intent that different users may have behind submitting a particular query. Personalizing search results is a complex problem given all the possible factors that could be used to customize search results. Further, personalization requires knowledge about the user and analysis of user data (e.g., profile data, past activities) in order to prioritize results based on the user. Performing this analysis of the user may be a complex operation, which may be difficult to perform online (e.g., at the time of the search) to sort the search results. To solve this problem, the embodiments of a system described herein relate to analyzing information of the user (e.g., user profile data, user intent for making the query, user activity history) to determine which results should be presented to the requesting user. For example, the use intent may include finding a new job, learning about a topic, connecting with other users, etc. Based on the inferred intent, the system can provide different search results and summaries to different users that submit the same query to more closely align with the intent of the respective user. By determining a user's intent, the system aims to provide the summary with relevant results based on the user's intent at that moment. It is noted that even though the results may be similar, the summary could be different based on the user intent, e.g., a user researcher on accessibility searching for Company X would get a summary related to the accessibility efforts from Company X, while a job seeker searching for Company X will get a summary of total job openings or Company X, hiring trends of Company X, etc., related to the job seeker.

The user intent may change over time as the user engages with the online service. For example, the user may be at some point working on increasing knowledge on a particular technical area by reading articles, making searches, following leaders in the technical area, etc. The intent at this point is "learning" or "skill improvement." Later, the same user may be actively looking for a new job, looking for job openings, communicating with recruiters, applying to jobs, etc. The intent then will change to "job search."

The system determines the intent of the user at the time that a search is done and tailors the results to the current intent by prioritizing or boosting results that relate to the current intent. Further, the system provides summaries of the results and the summaries are personalized based on the intent of the user and information from the knowledge graph (e.g., connections of the user in the online service). Additionally, the system is capable of providing a personalized summary of the results based on the intent of the user, the information from the knowledge graph, and the search results.

One general aspect includes a computer-implemented method that includes an operation for receiving a search query from a device of a user, where the search query is associated with executing a function on an online platform. The method further includes operations for performing a search, via the online platform, based on the search query, and determining, by an ML model, an intent of the user associated with the search query based on input for the ML model comprising the search query, user profile information associated with the user, and activity information of the user. Further, the method includes generating a prompt based on the search query, the intent of the user, and one or more relationships between the user and one or more entities. Generating the prompt further comprises selecting a prompt template from a plurality of prompt templates, the prompt template comprising fields for the intent, the search query, and the one or more relationships; and filling in the fields in the selected prompt template with the intent, the search query, and the one or more relationships. The method further includes operations for feeding as input the prompt to a generative artificial intelligence (GAI) model, receiving a summary from the GAI model in response to the prompt, where the summary is based on the intent of the user, and causing presentation of the summary and one or more results returned by the search on a user interface (UI) of the device of the user.

For the purposes of this description the phrases "an online social networking application" and "an online social network system" may be referred to as and used interchangeably with the phrases "an online system," "*an online service," "a networked system," or merely "a connections network." It will also be noted that a connections network may be any type of an online network, such as, a professional network, an interest-based network, or any online networking system that permits users to join as registered members. For the purposes of this description, registered members of a connections network may be referred to as simply members or users, and some unregistered users may also access the services provided by the online service. As used herein, a "user" refers to any person accessing the service, either registered or unregistered. Further, some connection networks provide services to their members (e.g., search for jobs, search for candidates for jobs, job postings) without being a social network, and the principles presented herein may also be applied to these connection networks.

FIG. 1 is a search-results page 102, according to some example embodiments. The search-results page 102 of the online service includes a search field 104 for entering a search query. In this example, the user has entered a search for "taxes."

The results, based on the search query, include a summary 106 and related posts resulting from the query, such as post 108 and post 110, although more results may be available as the user scrolls down the page. Selecting a post will take the user to a posts-results page with the posts used to create the summary, and the view in the page focuses on the selected post. Further, a box 114 describes the type of content shown, e.g., posts, people, more posts. In the illustrated example, the selection is for presenting posts. Further, options 112 are presented for selecting a type of result. In some example embodiments, the options 112 include posts, people, companies, jobs, groups, schools, courses, events, products, and services, but other embodiments may utilize different option categories.

Different types of summaries may be created using the techniques described herein, such as summaries of posts in the user feed, details about entities (e.g., number of connections in the user's network that work in a given company, connections in your network that recently started working for this company), summaries of news, summaries of recent activities within a group, summaries of activities related to users working in the same company, summaries of learning courses for improving one's skills for career development, summaries of job posts that may be of interest to the user, summaries of candidates for a job post, etc. Additionally, the system may also generate recommendations to the user for reaching out to the entities mentioned in the summaries. The recommendations may include the next best action for the user to take based upon the intent of the user and the search results. For example, if the user enters the search query "computer programming" and is determined to have the intent of knowledge seeking in learning "computer programming," the system may not only display search results of courses in different types of computer programming language, but it also may recommend a most popular course for the user to take from among the search results of courses and an instructor who has experience and skill in teaching computer programming from among the user's connections in the social network, using the knowledge graph.

In this example, the online service has analyzed recent information about the user and determined that the user has been researching moving to California. A machine learning (ML) model is used to determine an intent of the user based on these recent activities. The online service then uses this determined intent to prioritize the results for the search of "taxes" to those results with information about taxes in California. Also, the search will prioritize results associated with the user moving, such as jobs in California, information about companies in California, etc.

The summary 106 includes a summary that is based on the results and a message indicating "30 posts summarized by AI," to inform the user that the summary has been generated by an Artificial Intelligence (AI) model. This summary is personalized for the user based on the user intent and other user information (e.g., profile information such as title, skills, degrees, current job).

One goal is to provide a crisp summary of the search results, including a summary of the information gathered and multiple points of view in a few lines, that is personalized to the particular user, rather than scrolling through pages of search results. Thus, the goal of the online system is to save time for the user by providing clear summarized information so the user does not have to read multiple results to understand the results. Providing this customized, most-relevant information to the user is a challenging technical problem because the user intent can change frequently, even within the same day or even within the same session. Thus, the summary provided to the user has to be created in real time based on the current intent of the user (e.g., based on the recent activities of the user). Further, as the knowledge graph changes, the summary creation changes (e.g., a company just announced a hiring freeze so the system may inform the user of this fact and give a low rank to jobs from this company to the job seeker). Indeed, changes in the knowledge graph reflect changes in the degree of a relationship between entities. Thus, the entities within the knowledge graph evolve based on news and information that may be announced by the company. For example, the system may have access to search optimization tools that alter the degree of the relationship between entities in near real-time or real-time.

The summary may depend on the type of query, such as a search query for a topic (e.g., cryptocurrency), a news query (e.g., elections), a person's name query, a jobs query, etc. For example, if the query is for "Microsoft jobs," the summary may include information such as, "We know that you have a machine learning background, and here are the jobs that are related to machine learning at Microsoft. We have about six or seven jobs that you might find relevant."

The summaries created are based on the ability to understand multiple entities included in the knowledge graph and the user intent. An example summary may be as follows: "As a job seeker with machine learning experience, Company X advances in AI tools might be of great interest to you (see articles 1-3). Company X has recently opened 25 new jobs and hired around 15 people in the field of AI, and continues to invest in this area. There are 17 people in your network from Company X who can reach out to learn more or get a job referral. Here are 10 jobs that we think you will find relevant based on your work experience, and 5 courses that may interest you. Members who have recently started their journey have benefitted by taking these courses.

In prior solutions, a search for a company (e.g., Microsoft) could generate the same results for every searching user. However, the needs of the searchers can be different, e.g., a knowledge seeker, or a job seeker. In the presented embodiments, the summaries vary based on the intent of the searcher.

As an example, if the user's intent is job seeker, and the user searches for "Company X", the online service will provide search results that show hiring recruiters at Company X or job listings at Company X. Also, the online service may search for connections of the user to Company X (e.g., direct connections, second level connections, third level, etc.) and add information in the results about the connections at Company X, and even tie the job postings to the connections of the user and prioritize job postings that are linked to connections of the user. Further, the search results may also prioritize information about Company X, such as the company's headcount, growth, financial performance, number of hires in the last six month, is the company remote-work friendly, etc. However, if the same user changes focus and the intent changes to knowledge seeker, the results will prioritize the latest news about the company, such as information on new products, mergers and acquisitions, stock price, etc.

Similarly, for a knowledge seeker, a search for Company X will prioritize results related to learning about Company X's products and services (e.g., how to use a database tool) and show course offerings that are available to obtain knowledge about the technology of Company X.

Typically, when searching on search engines, users have to click on one or more results and go through pages of text to find what the information they are looking for. The present embodiments for summarizing results take advantage of the knowledge embedded in the online service, such as user profile information, user activities, user connections, etc., and the summaries are provided in a way that is tactical and contextual to the user and the query. Additionally, the search results are ranked using criteria that is personalized to the user.

In some example embodiments, the summary 106 may also include options (e.g., buttons, not shown) to perform additional actions. For example, in a job search, if a job post is presented, options could include "apply for job," "see more jobs like this," "more information about this job," etc. The additional actions are determined based on at least one of the personalized search summary, the user intent, activities of the user on the online service, or the user profile. For example, if the user intent is determined to be job search, the user feed may show one or more job posts relevant for the user with an option to select each of the job posts for further information, or even an option to apply for the job.

Similarly for people searches, for example, if someone is searching for people in "machine learning," the online service provides a summary of people in the ML field who can help the searcher to find jobs or a mentor. The summary will indicate some information regarding the results associated with the people search for ML, such as the latest articles, latest trends, product releases of the companies where people work, etc.

In other embodiments, instead of providing the summary in summary 106, the search-results page 102 does not include the summary and includes a title for the summary and an option to get the detailed summary if the user chooses to do so.

The goals for creating the summary include, at least: 1) provide a high degree of customization of summary and search results based on the current user intent (e.g., the summary should summarize the content that users would most likely want to read for that topic), and the summary must be accurate (e.g., only show a summary if is estimated that a reasonable number of people in the community believe the narrative to be accurate); 2) provide suggested next actions that are aligned with the user's intent; and 3) provide a summary that is quick to read, (e.g., the summary should not take more than 60 seconds to read).

Figure 2:
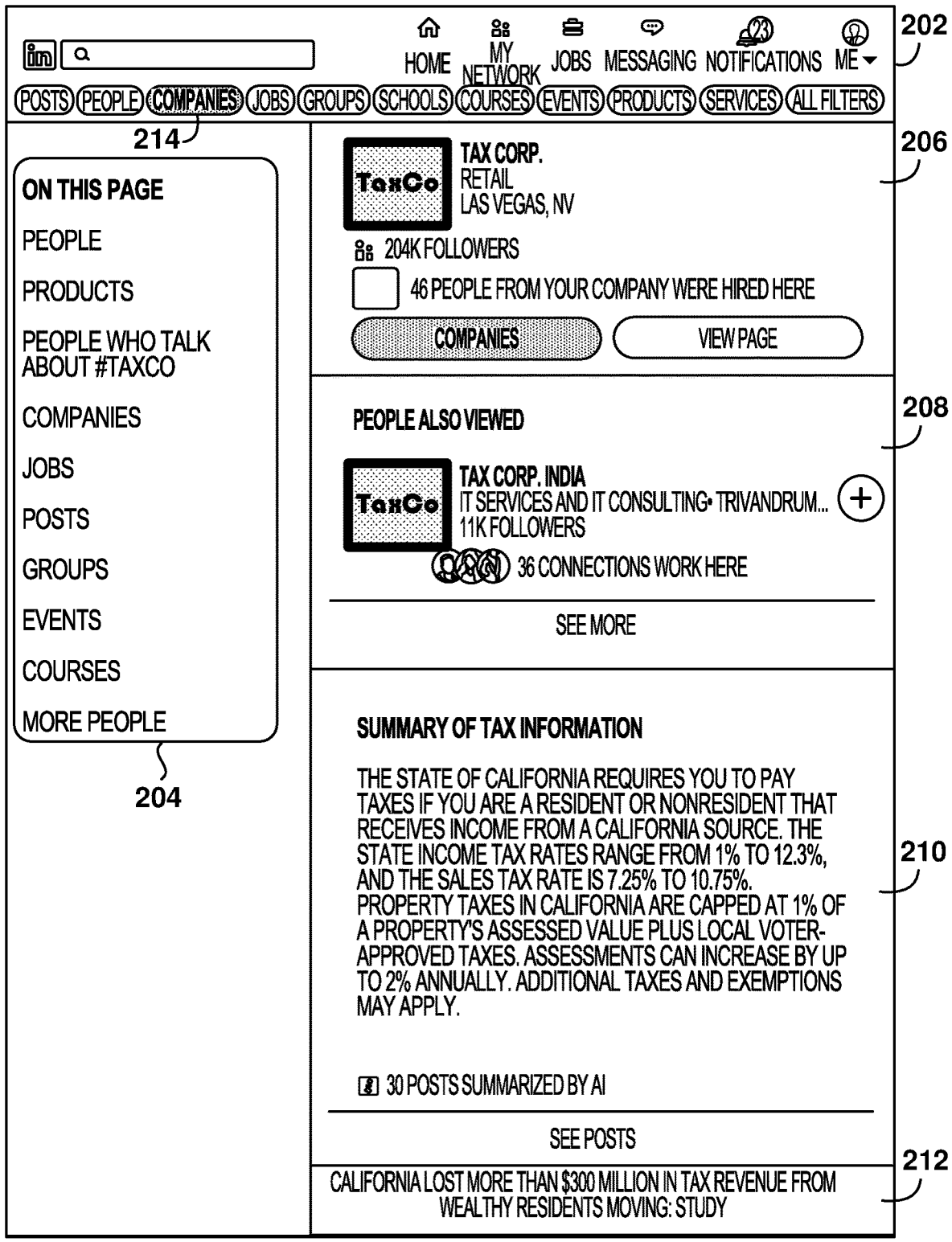
FIG. 2 is a search-results page for a company search, according to some example embodiments.

FIG. 2 is a search-results page 202 for a company search, according to some example embodiments. The illustrated example is for extracting information about a company named TaxCo after the companies option 214 has been selected after the search for "Taxes," as described above with reference to FIG. 1. Further, the system has determined that the user intent at the current time is to obtain tax-preparation services. Further, the user has several connections to the company TaxCo, so the company TaxCo has been selected as the first choice for presenting tax-preparation services to the user.

The search-results page 202 includes a company header 206, related views 208, a summary 210, and an expandable related summary 212.

Further, box 204 describes other options for the type of results desired. In the illustrated example, the "Companies" option is the one being presented.

The company header 206 describes high-level information about the company, such as name, industry, CD, logo, number of followers, number of people that were previously higher from the company of the user, an option to follow the company, and another option to view the page of the company in the online service.

In the illustrated example, the user has several connections with the company TaxCo and the related views 208 includes an indicator with the number of connections in the regional office in India, and if the user selects the connections, another page will show more detailed information on the connections of the user.

The summary 210 describes the summary as previously described with reference to FIG. 1. In some example embodiments, more than one summary may be presented to show a different aspect of the results. In the illustrated example, a second expandable summary 212 provides a title and the option to get more information associated with the title, including a related summary.

The online service aims to simplify the process for users to understand the key event in the topic they searched for by providing an easy-to-parse quick summary, eliminating the need to read multiple posts. The online service decreases the overall effort a user needs to invest to obtain specific pieces of information from a particular result. This makes the evaluation of the relevance of a result easier and reduces the need to delve into a result.

Providing users with a top-level overview of a topic will help them quickly understand what is happening within a certain topic without feeling disoriented or needing to read through many posts to gain a grounded understanding of the topic. This approach reduces friction in users acquiring knowledge on the online service, empower users to consume content more effectively, and will increase the frequency and number of people returning to the online service for topical knowledge.

FIG. 3 shows a summary 302 with feedback options 304, according to some example embodiments. In some example embodiments, information about the summary presented may be collected by the online service to improve the quality of summaries. For example, A/B testing may be used to check the performance of different prompts for creating the summaries, or to test different models that determine the user intent, as described in more detail below.

In the illustrated example, the feedback options 304 include a thumbs-up icon (for positive feedback) and a thumbs-down icon (for negative feedback). The feedback obtained from users may be used to improve the GAI model used to generate summaries, that is, the feedback (including the summary, the prompt that generated the summary, and the positive or negative sentiment) can be used as training data for future incremental training of the GAI model. In some example embodiments, the prompts are adjusted based upon evaluation (human or metric). For example, a metric would be that the summary is not determined to be relevant enough to the search results or to the search query.

Figure 4:
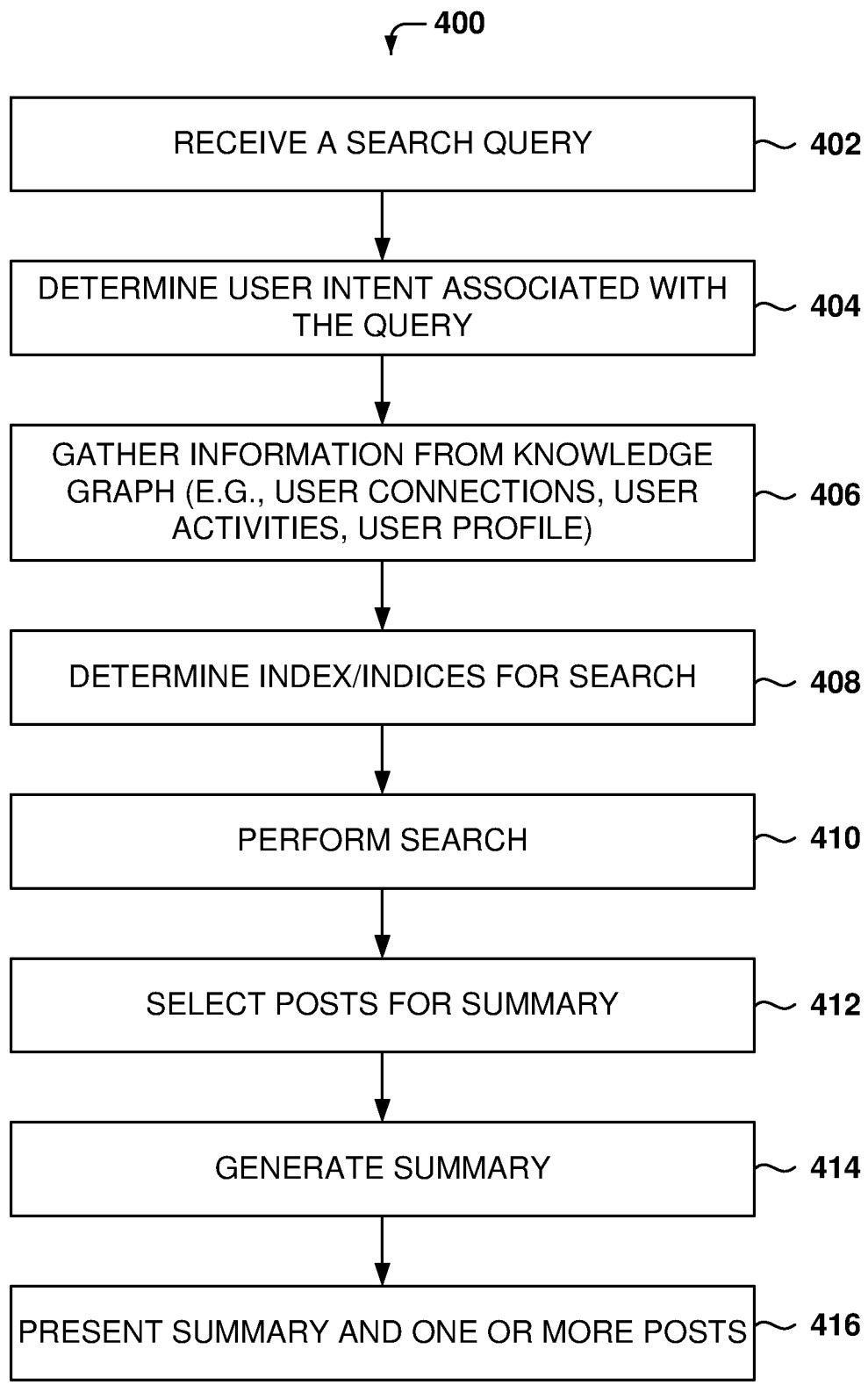
FIG. 4 is a flowchart of a method to perform a search and present results with a summary, according to some example embodiments.

FIG. 4 is a flowchart of a method 400 to perform a search and present results with a summary, according to some example embodiments. While the various operations in this flowchart are presented and described sequentially, one of ordinary skill will appreciate that some or all of the operations may be executed in a different order, be combined or omitted, or be executed in parallel.

At operation 402, a search query is received from a user via the UI. The search query includes one or more text terms or words outlining the desired search. In some instances, the search query can also be automatically suggested or pre-filled in the search box by the service based on the information about the user, such as the user's intent, user connections, user profile information, etc.

From operation 402, the method 400 flows to operation 404 where the intent of the user associated with the query is determined. Intent refers to the purpose or goal of the user making the query, and the intent depends on the situation of the user, in particular, with reference to the activities on the online service.

In some example embodiments, the online service utilizes machine-learning (ML) models trained on historical data of users' queries, selected search results, and profile information. When a user enters a new query, the query is input into a model along with information about the user's profile data and user activity history. The model determines the user's most likely intent in conducting that search. Some examples of intent include:

job seeking: the user is searching for new job opportunities or career information;
knowledge seeking: the user is searching to learn more about a particular topic or area of interest;
people seeking: the user is searching to connect with other professionals or find people with a particular background or expertise;
content seeking: the user is searching for news, opinions, or discussions on a topic;
company seeking: the user is searching for information about a particular company; and
buying: the user is searching to buy a product.

In some example embodiments, the types of intent are the same as the options 112 shown in FIG. 1, that is, the types of intent include posts, people, companies, jobs, groups, schools, courses, events, products, and services, but other embodiments may utilize different types of intent. More details about the ML models used to calculate intent are provided below with reference to FIG. 5A.

From operation 404, the method 400 flows to operation 406 to gather information from the knowledge graph. The information may include any combination of contact information, activities of the user on the online service, profile information, etc. The knowledge graph information allows the system to provide better search results and summaries. For example, the system may use connection information to prioritize results that are associated with a direct connection of the user since the user will likely have more interest in something associated with a direct connection as well as giving the user an "inside" to a potential resource associated with a search result.

For example, if the user has the intent of job search, job results of companies that employ direct connections of the user will be prioritized since the user has the option to gather information or get a referral to get a job where the connection can help.

The profile of the user may be used in some cases, not only to determine the current user intent, but also to customize results and summaries. For example, if one user has the skill "machine learning" while other user does not have this skill or any related technical skill, and both users search for "machine learning news," the results and the summary for the first user will be more technical and dive in technical details of new product releases, features, etc. For the non-technical user, the news will provide summaries that do not require technical depth on machine learning, that is, summaries that are geared towards introducing the basic concepts of machine learning to the non-technical user, product information, resources for learning about machine learning, etc. In some example embodiments, a user may be new to the online service so there may not be sufficient information about this user to provide a personalized summary. In this case, a non-personalized summary may be provided to the user, where the summary may be generated by an ML model trained with other member behavior data. The other members and the user may have one or similar attributes that indicates that the user would benefit from the non-personalized summary.

From operation 406, the method 400 flows to operation 408 where the online service determines which search index, or indices, and database fields will provide the most relevant results for the user. For example, if the intent is job seeking, the system may access job listings, company profiles, information from the knowledge graph, etc. If the intent is knowledge seeking, the system may access posts, articles, and discussions on the topic.

For example, a query "AI regulation" will fall into the category of the news category. The estimated intent is content, so the online service utilizes a news search index. In some cases, multiple intents may be associated with the query, so multiple indices may be accessed for the search. If the intent was job searching, then a different search will be conducted for the jobs database. The prompt to determine intent would be different and would incorporate additional user information.

From operation 408, the method 400 flows to operation 410 where the search is performed to access the selected databases and corresponding indices. The search will retrieve a plurality of results and a predetermined number (e.g., 10) of the results with the top scores are selected for summarization. The number of results considered is configurable, e.g., in the range from two to fifty, but other values are also possible.

Multiple searches may be performed for a single query to obtain different opinions. For example, assuming that three posts are selected, and the posts provide different sentiment about the subject (e.g., positive or negative). A second query may ask, "what are some positive and negative opinions on this particular query?" There may be as many calls to the backend search system as necessary to retrieve documents of different flavors to get posts that have positive and negative sentiment.

From operation 410, the method 400 flows to operation 412 to select the posts for creating the summary, e.g., top ten posts with the highest relevance scores, where relevance relates to the value of the post to answer the question posed in the query.

In some example embodiments, the search results are ranked by a ranking ML model, where the results with a higher rank within the results page are more important than results with a lower rank within the feed. Sometimes, the highly relevant results to the search query occupy only the first or second highest ranking spots within the results page and the remaining results are considered less relevant. To address this variation, an LLM is used, in some embodiments, to determine the best number of results to use. A prompt for the LLM may include the following:
1. Weight the results while generating the summary using the ranked position number, i.e., give more preference to top posts;
2. use the ranking ML model scores to weight the search results;
3. figure out which posts are more relevant based on the intent and user profile and summarize accordingly.

In some example embodiments, the prompt may need to be adjusted to account for these different scenarios on the results page. In some example embodiments, the system keeps track of searches received and the results presented. For each candidate queries that are selected for summarization, the posts results that were impressed to the users are identified, and the top 10 most-frequent results are selected from this set. The text of these posts will be used for the summarization process.

From operation 412, the method 400 flows to operation 414, where the summary is generated. In some example embodiments, a Generative AI (GAI) model (e.g., a Large Language Model (LLMs)) is fed a prompt containing information about the user, their intent, the search query, and the results. Additionally, the prompt may include information from the knowledge graph about the user and their relationship to one or more entities. More details about the prompt used with the GAI tool are provided below with reference to FIG. 6.

Some of the most popular GAI models are based on deep learning and neural networks. These models can be trained on massive amounts of data and can generate highly realistic and convincing content, such as text, images, audio, speech, or video. Some of the existing GAI models include tools that generate text, such as ChatGPT, Generative Pre-trained Transformer 3 (GPT-3), GPT-2, Transformer-XL, CTRL, Bidirectional Encoder Representations from Transformers (BERT), Textgenmn, Frase IO, Peppertype, Rytr, Copy. ai, Bloom, ChatSonic, and Jasper. There are also models that generate images, such as Stable Diffusion, DALL-E, starryai, Craiyon, NightCafe, and Artbreeder, and models that generate video, such as Synthesia, Lumen5, Flexclip, Elai, and Veed.io, and models that generate audio, such as Replica, Speechify, Murf, Play.ht, and Lovo.ai.

There are several types of architectures for generative AI models, such as Large Language Models (LLMs), transformer models, Variational Autoencoders (VAEs), Generative Adversarial Networks (GANs), Autoregressive Models, Flow-based Models, and Boltzmann Machines.

Large language models are deep learning models that are trained on massive amounts of text data to understand and generate natural language text. LLMs are typically based on neural network architectures, such as transformer networks, and are trained using unsupervised learning techniques, such as masked language modeling and next sentence prediction. Transformer models are a type of deep learning model used for natural language processing (NLP) tasks, such as language translation, text summarization, and language understanding. They are based on a self-attention mechanism that allows the model to attend to different parts of the input sequence to calculate a representation for each word or subword in the sequence.

For example, ChatGPT generates a multi-line summary that is presented before the relevant search results. In some example embodiments, ChatGPT version 3.3 or 4 may be used, but other past and future versions may also be utilized of ChatGPT and other LLMs.

From operation 414, the method 400 flows to operation 416 where the summary is presented on the UI together with the search results. In some example embodiments, just the summary is presented with an option that enables the user to view the posts associated with the summary.

Figure 5A:
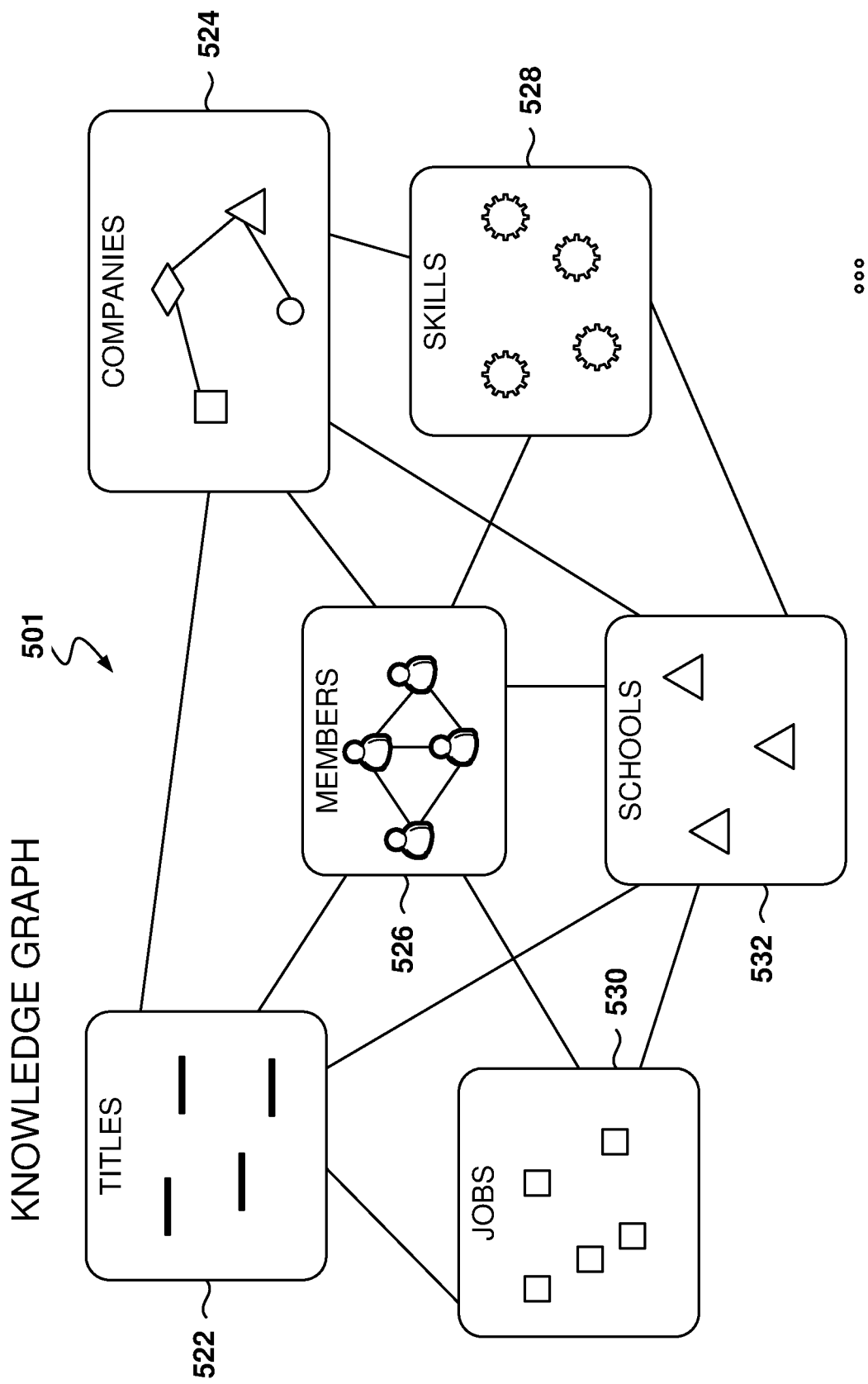
FIG. 5A illustrates the information stored in the knowledge graph, according to some example embodiments.

FIG. 5A illustrates the information stored in the knowledge graph 501, according to some example embodiments. The knowledge graph 501 is a large knowledge base built upon the concept of entities, such as members 526, jobs 530, titles 522, skills 528, companies 524, schools 532, etc., and the relationships (e.g., connections) between these entities.

The knowledge graph is used to power a variety of features, including:
Recommendations: the knowledge graph is used to recommend jobs, people, and content to users. For example, it can recommend jobs that are a good fit for a user's skills and experience, or people who are similar to a user in terms of their professional background.
Search: the knowledge graph is used to improve the accuracy and relevance of search results on the online service. For example, it can help to match search queries to relevant job postings, people, and content.
Analytics: the knowledge graph is used to generate insights about the online service community. For example, it can be used to track trends in the job market, or to identify the skills that are in demand.

The knowledge graph is a dynamic graph, meaning that it is constantly being updated with new information, and is a large-scale graph, with billions of entities and trillions of relationships. Further, the knowledge graph is a privacy-preserving graph, with all personal information anonymized.

The information of the knowledge graph 501 may be used by the ML model to determine user intent. For example, the previous search queries entered by the user, the connections of the user in the online service, the articles that the user has read, etc.

Embodiments provide the ability to deliver a high-level of customized search based upon the intent ML model and the relationship information in the knowledge graph. For example, if a user enters a search query for AI development, has previously expressed interest in AI development, follows an AI company in the online service on LI, but nothing about the past search activity indicates that the user has searched for the AI company, a traditional search engine will not prioritize results for the AI products of the AI company.

However, using the information of the knowledge graph identifying relationships between the companies and its employees, the online service can detect that a first-level connection of the user works at the AI company and generate a personalized summary with a list of search results that factors content by the AI company and its AI products. Further, it is not just the connections that are considered, but also the strength and complexity of those connections that can adjust the search results accordingly.

Figure 5B:
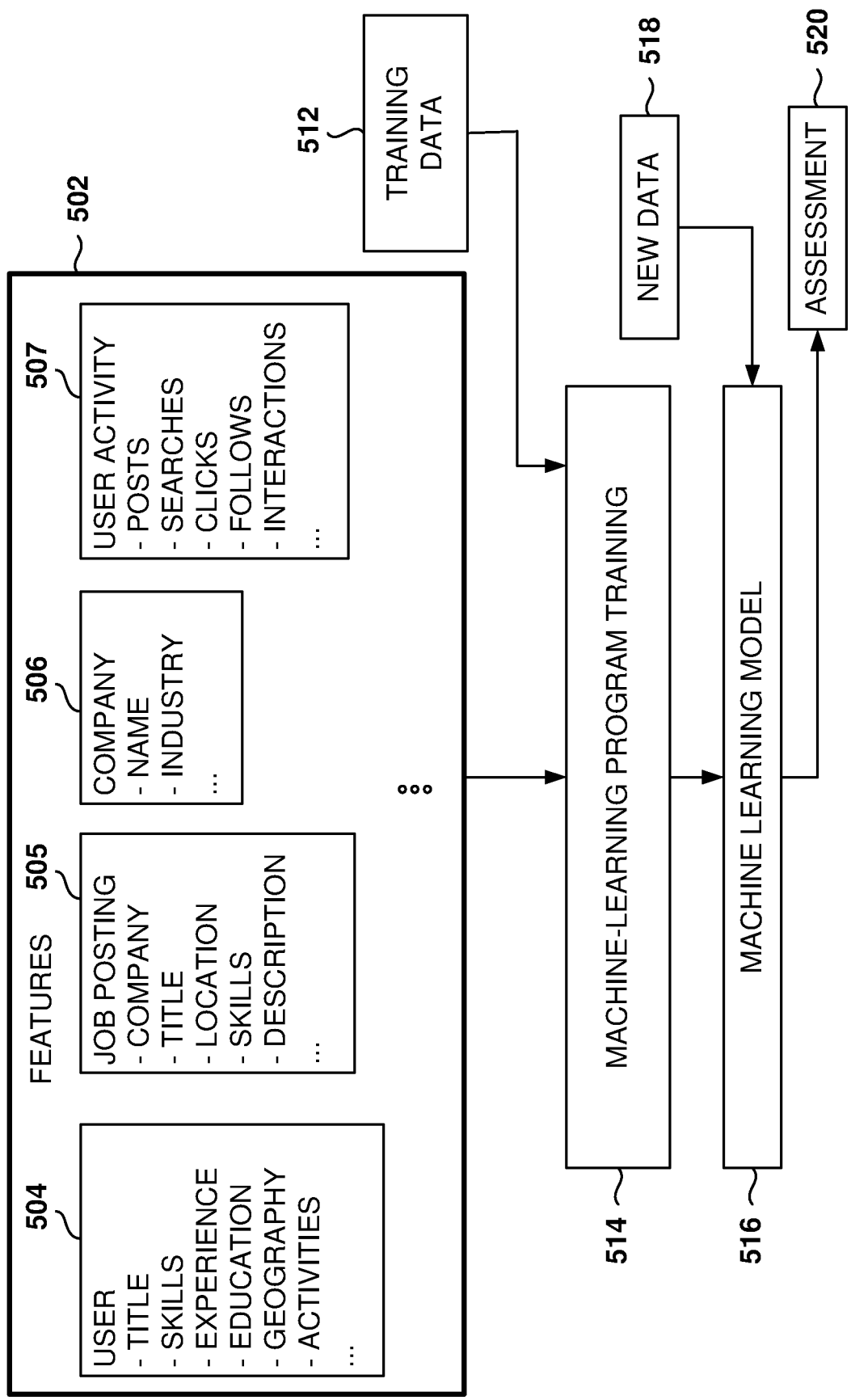
FIG. 5B illustrates the training and use of a machine-learning program, according to some example embodiments.

FIG. 5B illustrates the training and use of a machine-learning program, according to some example embodiments. In some example embodiments, machine-learning programs (MLP), also referred to as machine-learning algorithms or tools, are utilized to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 512 in order to make data-driven predictions or decisions expressed as outputs or assessments 520. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), deep neural networks (DNN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). The machine-learning algorithms utilize the training data 512 to find correlations among identified features 502 that affect the outcome.

The machine-learning algorithms utilize features 502 for analyzing the data to generate assessments 520. A feature 502 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as categorical, numeric, strings, and graphs. A categorical feature is a feature that may be assigned a value from a plurality of predetermined possible values (e.g., this animal is a dog, a cat, or a bird).

In one example embodiment, the features 502 may be of different types and may include one or more of user features 504, job-posting features 505, company features 506, and user-activity features 507 (e.g., user posts, web activity, followed companies, etc.).

The user features 504 include user profile information, such as title, skills, experience, education, geography, activities of the user in the online service, etc. The job posting features 505 include information about job postings, such as company offering the job, title of the job post, location of the job post, skills required, description of the job, etc. Further, the company features 506 include information about the company posting the job, such as name of the company, industry, revenue information, locations, etc. The user-activity features 507 include data about the actions of the user in the online service, such as user posts, searches requested by the user, clicks on items in the user feed, request to follow other users or entities, interactions with other users, etc.

The ML algorithms utilize the training data 512 to find correlations among the identified features 502 that affect the outcome or assessment 520. In some example embodiments, the training data 512 includes search queries, user's profile information, and user's historical interactions with searches, to build a model that provides the intent of the user when submitting a query. In some example embodiments, the training data further comprises knowledge-graph information, the knowledge-graph information comprising relationship data for entities of the online service.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalisation tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

With the training data 512 and the identified features 502, the ML algorithm is trained at operation 514. The ML training appraises the value of the features 502 as they correlate to the training data 512. The result of the training is the ML model 516.

When the ML model 516 is used to perform an assessment, new data 518 is provided as an input to the ML model 516, and the ML model 516 generates the assessment 520 as output. For example, the ML model 516 may be used to determine user intent when a search query is received. In some example embodiments, the input to the ML model 516 includes the query, information about the user associated with the query (e.g., a user ID, profile information), and information about activities of the user in the online service. The output is the user intent selected from a plurality of user intents. In some example embodiments, the plurality of user intents includes posts, people, companies, jobs, groups, schools, courses, events, products, and services, but other embodiments may utilize different option categories.

It is noted that users may interact with different search intents, e.g., the user may be interested in job posts and also in learning more about a certain technical field. For instance, if the query is "mRNA vaccine," a user might interact with a special cluster called "people who talk about mRNA vaccine," and interact with job posts. In some example embodiments, the ML model 516 does not return a single intent for a particular query, but the ML model 516 returns a confidence score for all the intent categories.

Figure 6:
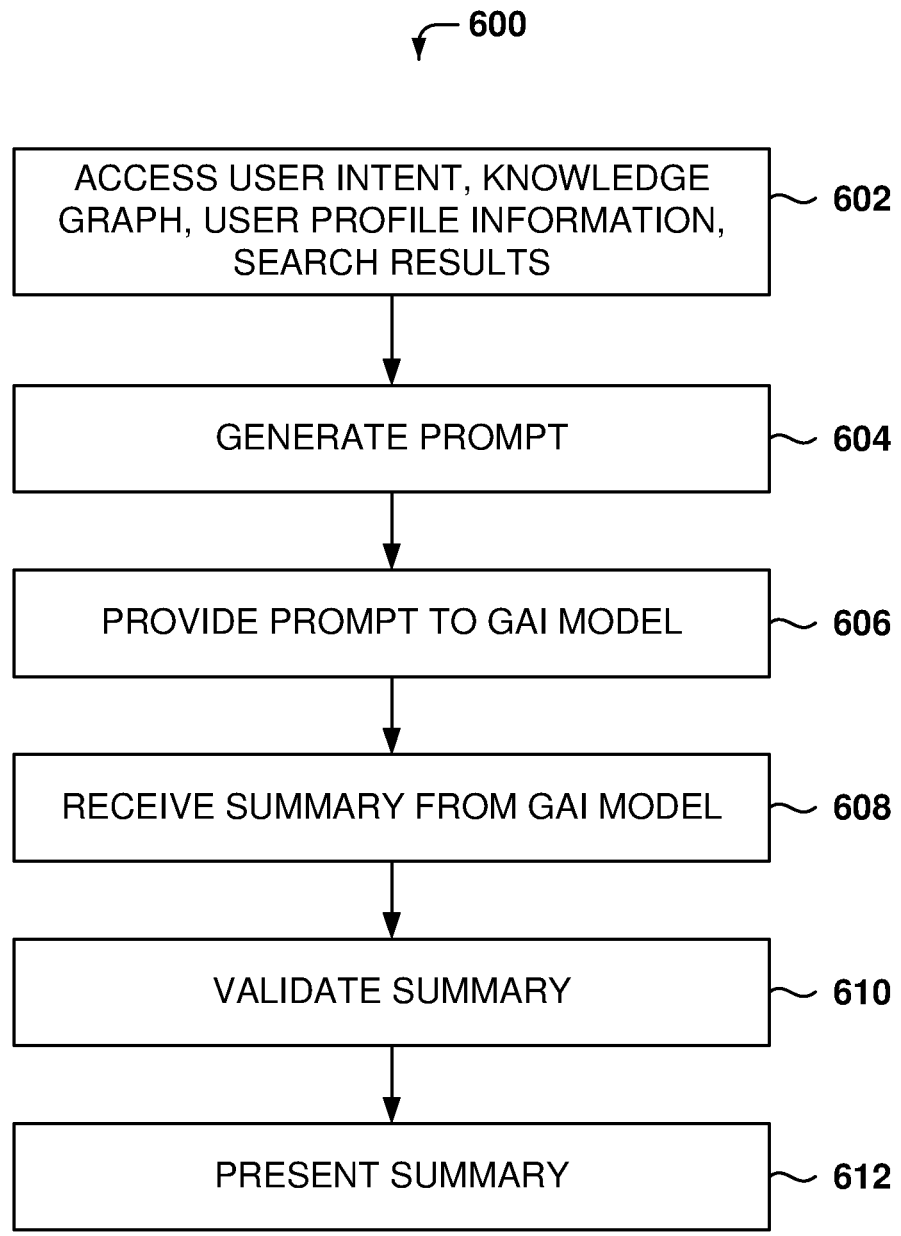
FIG. 6 is a flowchart of a method for generating a prompt to be used for creating the summary, according to some example embodiments.

FIG. 6 is a flowchart of a method 600 for generating a prompt to be used for creating the summary, according to some example embodiments. While the various operations in this flowchart are presented and described sequentially, one of ordinary skill will appreciate that some or all of the operations may be executed in a different order, be combined or omitted, or be executed in parallel.

At operation 602, the information for generating the prompt is gathered, such as the determined user intent, the knowledge graph, user profile information, and the selected search results for summarization. The gathered information can be included in the prompt.

From operation 602, the method 600 flows to operation 604 to generate the prompt based on at least one of user intent, the knowledge graph (e.g., connection information), the user profile information, or the search results. The connection information may include direct connections, or direct and second level connections, or even direct, second level, and third level connections. The profile information may include user title, history of previous titles, skills, current company, and recent activity on the online service (e.g., the last month).

For example, the current query may be "oncology," and if the user previously queried for "mRNA vaccine," this context can be added to the prompt, as well as other recent search history information.

The prompts are engineered to request a concise, yet comprehensive summary of the most relevant results based on what the user wants to accomplish. For example, a prompt for a job seeking user may contain:
the user's job title and experience;
the search query (e.g., "data scientist jobs");
the top 3-5 job listings found, including job titles, companies, locations, and descriptions; and
a request for a three-sentence summary of the key details of the jobs.

In some example embodiments, the system includes a library of prompt templates for different intents that are populated with the user's specific information and search results. The prompts and fields used can differ based on the intent. For example, for a knowledge seeking intent, the prompt may focus more on summarizing discussions and opinions on the topic, and for a job-search intent, the prompt will focus on finding job opportunities related to the user skills.

The selected fields are filled into the prompt and fed into the GAI model. There may be common fields for different intents, such as industry, but there will also be different types of customizations and fields used for different intents.

A sample prompt template for a user interested in a job search may be as follows:
"Member is looking for information about "{query}". The "Member intent is "{job search}", member title is "{title}", member company is "{company}", member skills are "{member skills}", number years of experience is "{years}", member zip code is "{member zip code}". The query is for a company search. Following are the posts authored by members. It is of the json format {"author": "authorname", "post":"text"}. Return a few lines summary of the text quoting author's names and relevant to the "query""

In another example, a user is searching for posts on a specific topic, e.g., the query is "Bank of Dreams." The online service determines that this is a trending query and that the user intent is to gather information about a company. The searched then is performed with diversity filters to get posts with varied perspectives, and three articles are selected for summarization. The prompt in this example would be (some of the post text is omitted for brevity):
"Member is looking for information about "{query}". The query is trending and is a news. Following are the posts authored by members. It is of the json format {"author": "authorname", "post":"text"}. Return a few line summary of the text quoting author's names and relevant to the "query""
{"author": Laura Smith, "text": "Back in March, we watched as the downfall of Bank of Dreams, The Infinite Bank, and others, which created doubt in our banking systems. While bank failures are not something new, Americans haven't seen significant bank failures in over a decade . . . . So what do we do now? With standard US banks, [rest of article 1] . . . }
{"author": "John Doe", "text":"Analyzing the "David v. Goliath" aspects of how fintechs like Alex were uniquely positioned to excel during the Bank of Dreams crisis where banks simply were not:"}
{"author": "Stuart", "text": The American banking landscape is undergoing a significant shift since the 2008 financial crisis. Rising interest rates and losses on loans are squeezing banks' profits, while regulators are focusing on supervisory lapses. As a result, many smaller banks will be forced into mergers with stronger institutions. How will this impact the future of banking?#BankingShift #FinancialIndustry
Insights:
John Smith Bank CEO Peter Pan's takeover of troubled regional lender Bank of Dreams marked the end of one wave of problems and the start of another.
[rest of article 3] . . . }.

From operation 604, the method 600 flows to operation 606 to use the created prompt as an input for the GAI model. At operation 608, the summary generated by the GAI model is received. In some example embodiments, the GAI model also returns information on the sources used to create the summary. The summaries are connected to the original search results used to generate them so the user can verify the information and access the full details.

In the example for the "Bank of Dreams" query, the following summary was generated:

John Doe highlights the collapse of the Bank of Dreams and others, subsequently emphasizing Smith's solution to help protect company funds by offering up to $50 m in FDIC coverage. An anonymous post from Smith illustrates the advantage of fintech companies like Alex, which thrived amidst the crisis where traditional banks like Bank of Dreams struggled. Meanwhile, Doe provides an overview of the altering American banking landscape, citing the Bank of Dreams collapse as a trigger for increased regulatory scrutiny and possible mergers of smaller banks with larger entities.

In another example, a job seeker is searching for jobs related to "Machine Learning." The online service determines that the searcher is job seeker and the query (Machine Learning) is a skill. The goal is to get posts related to hiring, to get jobs related to machine learning, and to get people who are hiring managers for machine learning. The prompt for the LLM is the following:

Searcher is a job seeker. He is looking for information related to machine learning. Below are jobs, posts and hiring managers in the json format. {"type": job or people or post, content: "text", company": "text"} Return a few lines summary of the text quoting author's names and company and relevant to the "{query}"
{jobs}
{posts}
{hiring managers}.

In some example embodiments, the personalization includes a profile of the user (e.g., {searcher profile}). The information of the searcher will be included in the prompt, e.g., work information, education, skills, title, etc. One example prompt is as follows:

Return a few lines summary of the text quoting author's names and company and relevant to the "{query}" and personalized to the searcher using the searcher profile below.

Searcher is a job seeker. The searcher is looking for information related to machine learning. Below are jobs, companies, posts, courses, hiring managers, relevant people in the json format. {"type": job or people or post, content: "text", company": "text"}

Return a few lines summary of the text quoting author's names and company and relevant to the "{query}" and personalized to the searcher using the searcher profile below.

searcher profile: {searcher profile}
jobs: {jobs}
companies: {companies}
posts: {posts}
hiring managers: {hiring managers}
relevant contacts: {relevant people}.

In another example, the query is "How to improve my public speaking skills." The online service determines that the query is associated with a question, extracts "public speaking" skill from the query, and retrieves results of four different types: content, groups, events, and people. The prompt for the LLM is the following:

Following is the information about the searcher:
Searcher lives in {San Francisco Bay Area}
Searcher is a {senior engineering manager} at company {Corp. X}
Searcher's last 5 queries are {how to avoid imposter syndrome, public speaking courses, mentors in public speaking, events near me, self-help groups}
Searcher liked posts from Jeff Weiner, Richard Branson
Searcher applied for No jobs.
Searcher completed courses in diversity and inclusion.
Following is the query from Searcher: {How to improve my public speaking skills}
The intent is to look for resources to improve the skill {public speaking}. Below are results from People, Posts, Groups, and Events related to public speaking.
{results from various verticals of people, posts, groups and events}
Generate a Summary for the searcher personalized based on the information provided relevant to the skill {public speaking} and answering the query {how to improve public speaking skills}.

From operation 608, the method 600 flows to operation 610 to validate the results before presenting them to the user. This post-processing is optional and is performed to check for accuracy and ensure the content meets the online service's guidelines. Also, responsibility checks may be made to ensure that the summary reflects the content of the posts that are being summarized.

From operation 610, the method 600 flows to operation 612 to present the summary, with one or more of the search results, on the UI of the requesting user.

In some example embodiments, options for next actions by the user may be suggested. For example, the online service may suggest, "These are the jobs that pertain to you because you are a machine learning engineer with five years of experience, so a senior engineer position might be ideal for you. Now you can apply for a job, look for more jobs, or look for posts."

Figure 7:
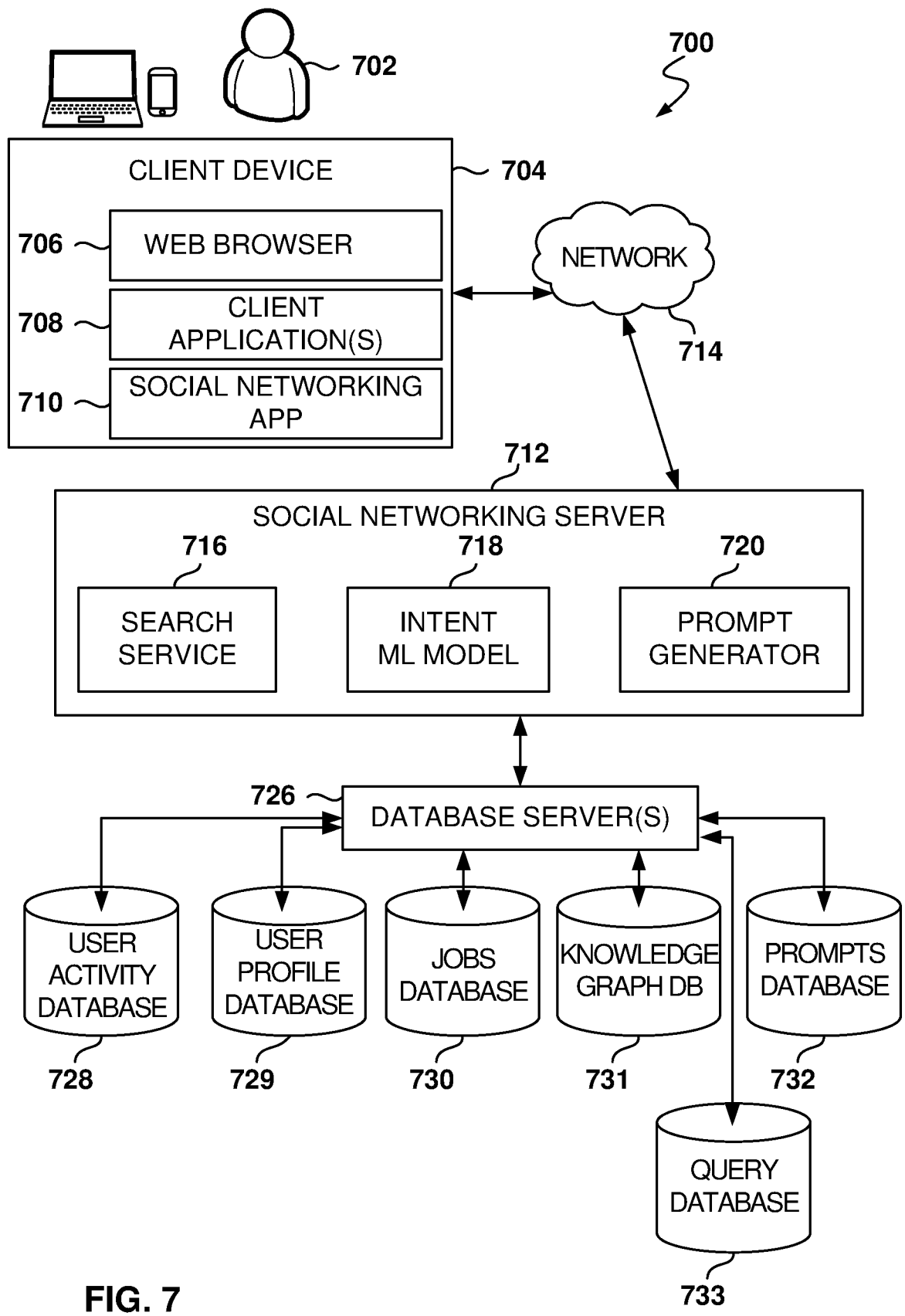
FIG. 7 is a block diagram illustrating a networked architecture, according to some example embodiments.

FIG. 7 is a block diagram illustrating a networked architecture 700, according to some example embodiments. The networked architecture 700 includes a networking server 712, illustrating an example embodiment of a high-level client-server-based network architecture. Embodiments are presented with reference to an online service, and, in some example embodiments, the online service is a social networking service.

The social networking server 712, a distributed system comprising one or more machines, provides server-side functionality via a network 714 (e.g., the Internet or a wide area network [WAN]) to one or more client devices 704. FIG. 7 illustrates, for example, a client device 704 with a web browser 706, client application(s) 708, and a social networking app 710 executing on the client device 704. The social networking server 712 is further communicatively coupled with one or more database servers 726 that provide access to one or more databases 728-1132.

The social networking server 712 includes, among other modules, a search service 716, the intent ML model 718, and the prompt generator 720. The search service 716 perform searches submitted by users. The post results of the query can be extracted from different sources, such as an offline content index that holds posts, an offline activity index that keeps track of user activities, and results from previous queries, online search of user posts on the online service.

The intent ML model 718 calculates the intent for the user that submits a search query, and the prompt generator 720 generates the prompts that are inputted to the GAI model for summarization.

The client device 704 may comprise, but is not limited to, a mobile phone, a desktop computer, a laptop, a tablet, a netbook, a multi-processor system, a microprocessor-based or programmable consumer electronic system, or any other communication device that the user 702 may utilize to access the social networking server 712. In some embodiments, the client device 704 may comprise a display module (not shown) to display information (e.g., in the form of user interfaces).

In one embodiment, the social networking server 712 is a network-based appliance, or a distributed system with multiple machines, which responds to initialization requests or search queries from the client device 704. One or more users 702 may be a person, a machine, or other means of interacting with the client device 704. In various embodiments, the user 702 interacts with the networked architecture 700 via the client device 704 or another means.

In some embodiments, if the social networking app 710 is present in the client device 704, then the social networking app 710 is configured to locally provide the user interface for the application and to communicate with the social networking server 712, on an as-needed basis for data and/or processing capabilities not locally available (e.g., to access a user profile, to authenticate a user 702, to identify or locate other connected users 702, etc.). Conversely, if the social networking app 710 is not included in the client device 704, the client device 704 may use the web browser 706 to access the social networking server 712.

In addition to the client device 704, the social networking server 712 communicates with the one or more database servers 726 and databases. In one example embodiment, the social networking server 712 is communicatively coupled to a user activity database 728, a user profile database 729, a jobs database 730, a knowledge graph database 731, a prompts database 732, and a query database 731.

The user activity database 728 keeps track of the activities of the users in the online service, such as articles read, posts added, interactions with other users, etc. The user profile database 729 holds information about the user, such as name, address, title, job history, connections on the online service, etc. The jobs database 730 holds information about job posts on the online service. The knowledge graph database 731 holds the information about the knowledge graph.

Further, the query database 733 holds information about previously submitted queries and information about the results of those queries. The prompts database 732 includes information about prompts, such as prompt templates and previously used prompts.

Different prompt templates may be generated for different intents. The fields utilized in the different prompt templates will then be different based on the user intent. For example, for a job seeker, the fields for the prompt template may include information about the title, skills, and job experience of the user, while the fields for a people seeker may include address, title, education history, and current company.

In some example embodiments, when a user 702 initially registers to become a user 702 of the social networking service provided by the social networking server 712, the user 702 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 729. Similarly, when a representative of an organization initially registers the organization with the social networking service provided by the social networking server 712, the representative may be prompted to provide certain information about the organization, such as a company industry.

Figure 8:
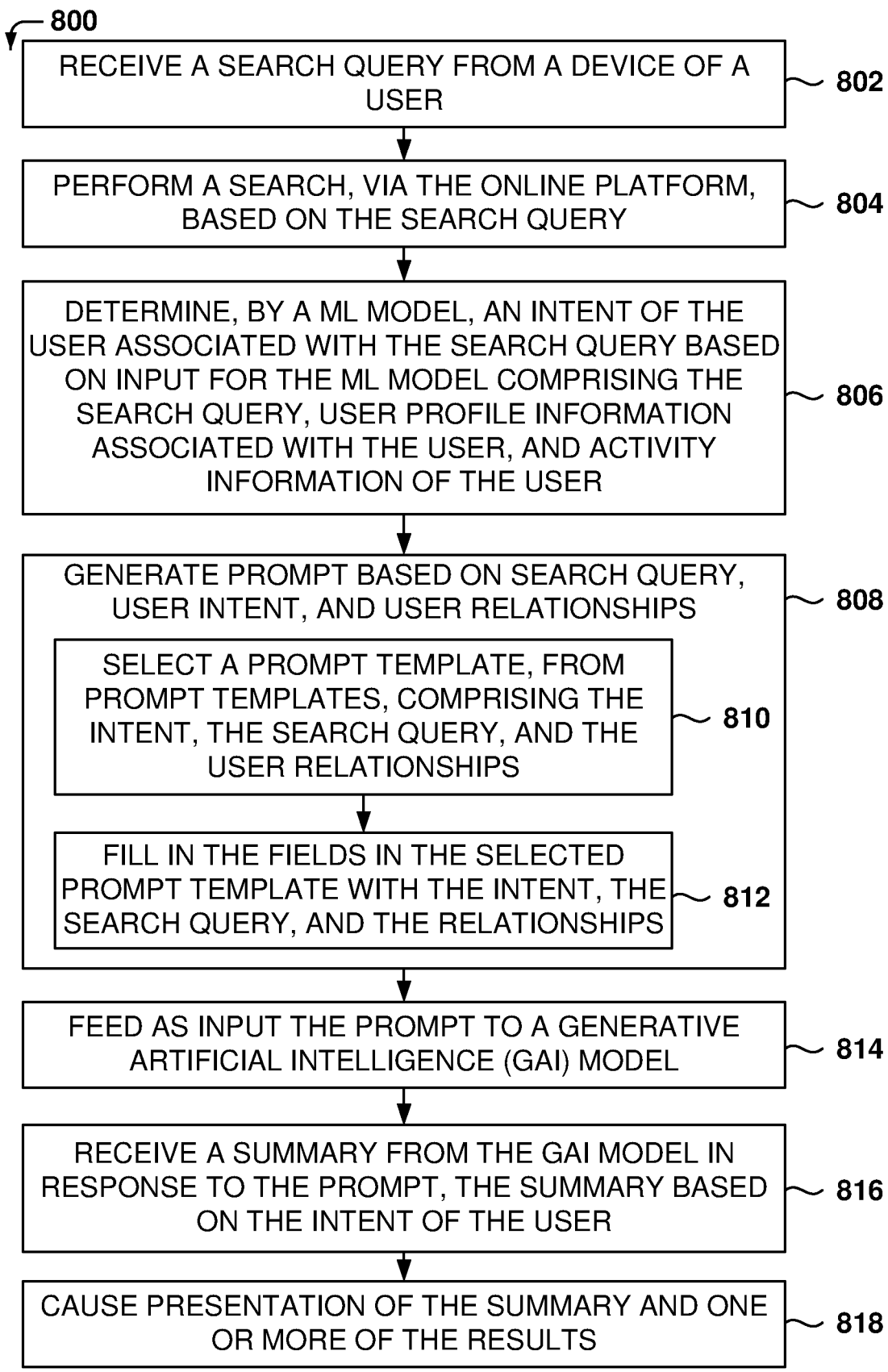
FIG. 8 is a flowchart of a method for presenting a summary with the results of a search, according to some example embodiments.

FIG. 8 is a flowchart of a method 800 for presenting a summary with the search results, according to some example embodiments. While the various operations in this flowchart are presented and described sequentially, one of ordinary skill will appreciate that some or all of the operations may be executed in a different order, be combined or omitted, or be executed in parallel.

Operation 802 is for receiving a search query from a device of a user of an online service, where the search query is associated with executing a function on an online platform.

From operation 802, the method 800 flows to operation 804 for performing a search, via the online platform, based on the search query. In some example embodiments, the search is performed without considering the intent of the user and then the intent is used to prioritize results and generate the summary. In other example embodiments, operation 806, to calculate the user intent, is performed before operation 804 and the user intent is provided as another parameter for the search, so the search results will be prioritized (e.g., sorted) based on the search query and the user intent.

From operation 804, the method 800 flows to operation 806 to determine, by a ML model, an intent of the user associated with the search query based on input for the ML model comprising the search query, user profile information associated with the user, and activity information of the user. The ML model is trained with training data comprising search queries, interactions of users with results of the search queries, profile information of the users, and activity information of the users.

From operation 806, the method 800 flows to operation 808 to generate a prompt based on the search query, the intent of the user, and one or more relationships between the user and one or more entities. Generating the prompt further comprises operations 810 and 812. Operation 810 is for selecting a prompt template from a plurality of prompt templates, the prompt template comprising fields for the intent, the search query, and the one or more relationships. Operation 812 is for filling in the fields in the selected prompt template with the intent, the search query, and the one or more relationships.

From operation 808, the method 800 flows to operation 814 feeding as input the prompt to a generative artificial intelligence (GAI) model.

From operation 814, the method 800 flows to operation 816 for receiving a summary from the GAI model in response to the prompt, wherein the summary is based on the intent of the user.

From operation 816, the method 800 flows to operation 818 to cause presentation of the summary and one or more of the results returned by the search on a user interface (UI) of the device of the user.

In view of the disclosure above, various examples are set forth below. It should be noted that one or more features of an example, taken in isolation or combination, should be considered within the disclosure of this application.

In one example, the user activity information comprises at least one of search queries submitted by the user, items posted by the user, interactions with other users, or items read in a user feed.

In one example, the interactions of the users with results of the search queries comprises results selected for obtaining additional details, follow-up searches, and actions taken based on the results.

In one example, features of the ML model comprise at least one of user skill, user title, user searches, or job post information.

In one example, the training data for the ML model further comprises information of a knowledge graph, the information of the knowledge graph comprising relationship data between users and between users and entities of the online platform, and a connection degree of the relationship data.

In one example, the prompt template is selected based on the intent, wherein different intents are associate with different prompt templates.

In one example, the method 800 further comprises sorting the results of the search query based on the user intent.

In one example, the method 800 further comprises, before causing presentation of the summary, performing a validation of the summary generated by the GAI model to check for accuracy and validate that the summary reflects content of the results being summarized.

In one example, the method 800 further comprises suggesting one or more next-actions for the user, wherein the one or more next-actions are based on the intent; and providing the one or more next-actions as selectable options in the UI.

In one example, the prompt template further comprises a user title and one or more user skills.

Another general aspect is for a system that includes a memory comprising instructions and one or more computer processors. The instructions, when executed by the one or more computer processors, cause the one or more computer processors to perform operations comprising: receiving a search query from a device of a user, wherein the search query is associated with executing a function on an online platform; performing a search, via the online platform, based on the search query; determining, by a ML model, an intent of the user associated with the search query based on input for the ML model comprising the search query, user profile information associated with the user, and activity information of the user; generating a prompt based on the search query, the intent of the user, and one or more relationships between the user and one or more entities, wherein generating the prompt further comprises: selecting a prompt template from a plurality of prompt templates, the prompt template comprising fields for the intent, the search query, and the one or more relationships; and filling in the fields in the selected prompt template with the intent and the search query; feeding as input the prompt to a generative artificial intelligence (GAI) model; receiving a summary from the GAI model in response to the prompt, wherein the summary is based on the intent of the user; and causing presentation of the summary and one or more results returned by the search on a user interface (UI) of the device of the user.

In yet another general aspect, a non-transitory machine-readable storage medium (e.g., a non-transitory storage medium) includes instructions that, when executed by a machine, cause the machine to perform operations comprising: receiving a search query from a device of a user, wherein the search query is associated with executing a function on an online platform; performing a search, via the online platform, based on the search query; determining, by a ML model, an intent of the user associated with the search query based on input for the ML model comprising the search query, user profile information associated with the user, and activity information of the user; generating a prompt based on the search query, the intent of the user, and one or more relationships between the user and one or more entities, wherein generating the prompt further comprises: selecting a prompt template from a plurality of prompt templates, the prompt template comprising fields for the intent, the search query, and the one or more relationships; and filling in the fields in the selected prompt template with the intent and the search query; feeding as input the prompt to a generative artificial intelligence (GAI) model; receiving a summary from the GAI model in response to the prompt, wherein the summary is based on the intent of the user; and causing presentation of the summary and one or more results returned by the search on a user interface (UI) of the device of the user.

Figure 9:
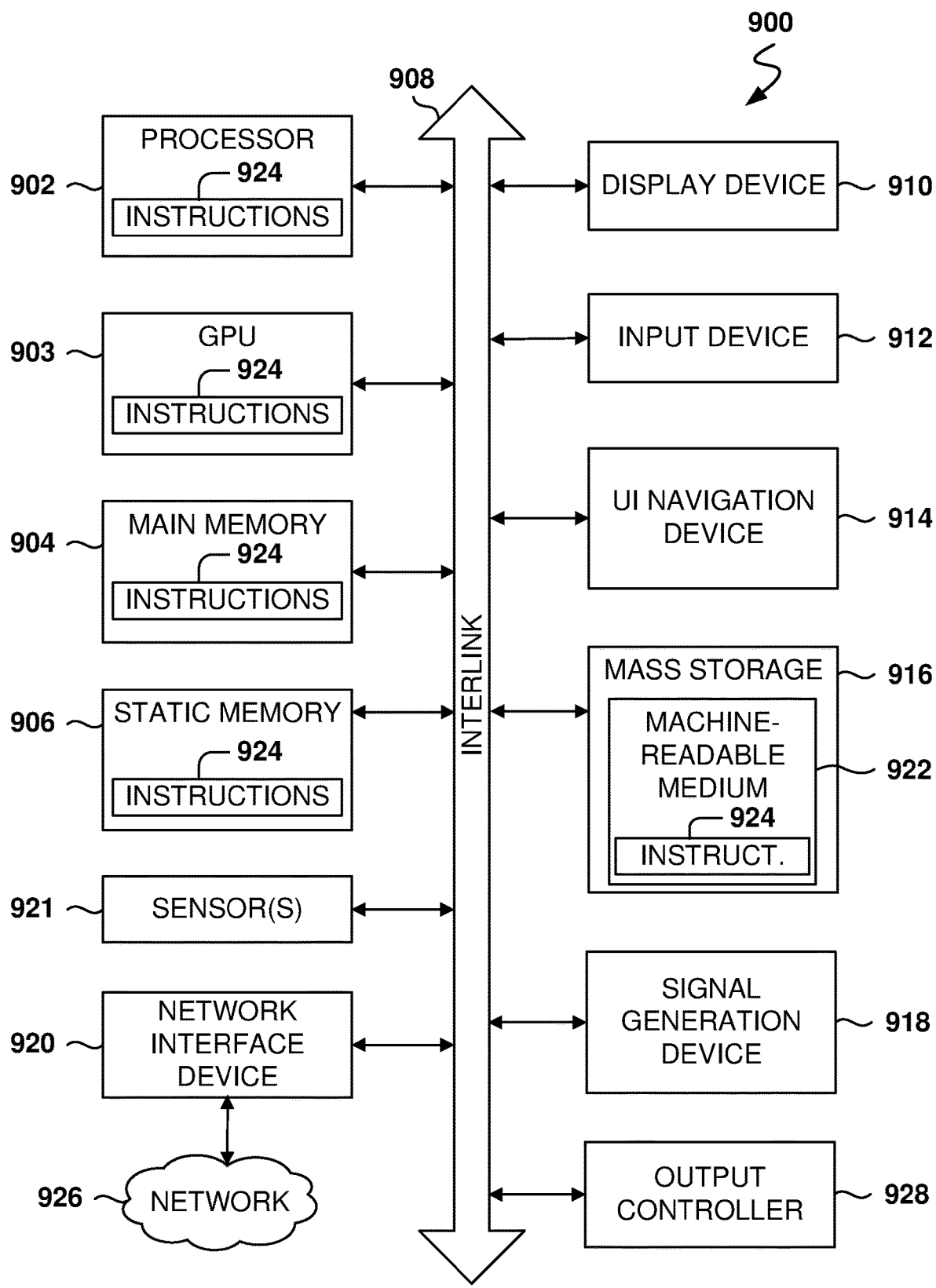
FIG. 9 is a block diagram illustrating an example of a machine upon or by which one or more example process embodiments described herein may be implemented or controlled.

FIG. 9 is a block diagram illustrating an example of a machine 900 upon or by which one or more example process embodiments described herein may be implemented or controlled. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in a peer-to-peer (P2P) (or other distributed) network environment. Further, while only a single machine 900 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine 900 (e.g., computer system) may include a hardware processor 902 (e.g., a central processing unit (CPU), a hardware processor core, or any combination thereof), a graphics processing unit (GPU 903), a main memory 904, and a static memory 906, some or all of which may communicate with each other via an interlink 908 (e.g., bus). The machine 900 may further include a display device 910, an alphanumeric input device 912 (e.g., a keyboard), and a user interface (UI) navigation device 914 (e.g., a mouse). In an example, the display device 910, alphanumeric input device 912, and UI navigation device 914 may be a touch screen display. The machine 900 may additionally include a mass storage device 916 (e.g., drive unit), a signal generation device 918 (e.g., a speaker), a network interface device 920, and one or more sensors 921, such as a Global Positioning System (GPS) sensor, compass, accelerometer, or another sensor. The machine 900 may include an output controller 928, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, within the hardware processor 902, or within the GPU 903 during execution thereof by the machine 900. In an example, one or any combination of the hardware processor 902, the GPU 903, the main memory 904, the static memory 906, or the mass storage device 916 may constitute machine-readable media.

While the machine-readable medium 922 is illustrated as a single medium, the term "machine-readable medium" may include a single medium, or multiple media, (e.g., a centralized or distributed database, and/or associated caches and servers) configured to store the one or more instructions 924.

The term "machine-readable medium" may include any medium that is capable of storing, encoding, or carrying instructions 924 for execution by the machine 900 and that cause the machine 900 to perform any one or more of the techniques of the present disclosure, or that is capable of storing, encoding, or carrying data structures used by or associated with such instructions 924. Non-limiting machine-readable medium examples may include solid-state memories, and optical and magnetic media. In an example, a massed machine-readable medium comprises a machine-readable medium 922 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   receiving a search query from a device of a user, wherein the search query is associated with executing a function on an online platform;
   performing a search, via the online platform, based on the search query to generate search results;
   determining, by a machine learning (ML) model, an intent of the user associated with the search query based on input for the ML model comprising the search query, user profile information associated with the user, and activity information of the user;

generating a prompt based on the search query, the intent of the user, and one or more relationships between the user and one or more entities, wherein generating the prompt further comprises:
  selecting a prompt template from a plurality of prompt templates based on the intent of the user, wherein different intents are associated with different prompt templates, the prompt template including a field for the intent of the user that is different from fields in other prompt templates from the plurality of prompt templates, the prompt template comprising fields for the intent, the search query, and the one or more relationships; and
  filling in the fields in the selected prompt template with the intent, the search query, and the one or more relationships;
feeding as input the prompt and a subset of the search results to a generative artificial intelligence (GAI) model;
receiving a summary from the GAI model in response to the prompt, wherein the summary is based on the intent of the user; and
causing presentation of the summary and one or more of the search results returned by the search on a user interface (UI) of the device of the user.

2. The method as recited in claim 1, wherein the user activity information comprises at least one of search queries submitted by the user, items posted by the user, interactions with other users, interactions of the user with results of the search queries, or items read in a user feed.

3. The method as recited in claim 2, wherein the interactions of the users with results of the search queries comprises results selected for obtaining additional details, follow-up searches, and actions taken based on the results.

4. The method as recited in claim 1, wherein features of the ML model comprise at least one of user skill, user title, user searches, or job post information.

5. The method as recited in claim 1, wherein training data for the ML model further comprises information of a knowledge graph, the information of the knowledge graph comprising relationship data between users and between users and entities of the online platform, and a connection degree of the relationship data.

6. The method as recited in claim 1, wherein the prompt template is selected based on the intent, wherein different intents are associate with different prompt templates.

7. The method as recited in claim 1, further comprising:
sorting the results of the search query based on the user intent.

8. The method as recited in claim 1, further comprising:
before causing presentation of the summary, performing a validation of the summary generated by the GAI model to check for accuracy and validate that the summary reflects content of the results being summarized.

9. The method as recited in claim 1, further comprising:
suggesting one or more next-actions for the user, wherein the one or more next-actions are based on the intent; and
providing the one or more next-actions as selectable options in the UI.

10. The method as recited in claim 1, wherein the prompt template further comprises a user title and one or more user skills.

11. A system comprising:
a memory comprising instructions; and
one or more computer processors, wherein the instructions, when executed by the one or more computer processors, cause the system to perform operations comprising:
  receiving a search query from a device of a user, wherein the search query is associated with executing a function on an online platform;
  performing a search, via the online platform, based on the search query;
  determining, by a machine learning (ML) model, an intent of the user associated with the search query based on input for the ML model comprising the search query, user profile information associated with the user, and activity information of the user;
  generating a prompt based on the search query, the intent of the user, and one or more relationships between the user and one or more entities, wherein generating the prompt further comprises:
    selecting a prompt template from a plurality of prompt templates based on the intent of the user, wherein different intents are associated with different prompt templates, the prompt template including a field for the intent of the user that is different from fields in other prompt templates from the plurality of prompt templates, the prompt template comprising fields for the intent, the search query, and the one or more relationships; and
    filling in the fields in the selected prompt template with the intent, the search query, and the one or more relationships;
  feeding as input the prompt and a subset of the search results to a generative artificial intelligence (GAI) model;
  receiving a summary from the GAI model in response to the prompt, wherein the summary is based on the intent of the user; and
  causing presentation of the summary and one or more of the search results returned by the search on a user interface (UI) of the device of the user.

12. The system as recited in claim 11, wherein the user activity information comprises at least one of search queries submitted by the user, items posted by the user, interactions with other users, interactions of the user with results of the search queries, or items read in a user feed.

13. The system as recited in claim 12, wherein the interactions of the users with results of the search queries comprises results selected for obtaining additional details, follow-up searches, and actions taken based on the results.

14. The system as recited in claim 13, wherein features of the ML model comprise at least one of user skill, user title, user searches, or job post information.

15. The system as recited in claim 11, wherein training data for the ML model further comprises information of a knowledge graph, the information of the knowledge graph comprising relationship data between users and between users and entities of the online platform, and a connection degree of the relationship data.

16. A non-transitory machine-readable storage medium including instructions that, when executed by a machine, cause the machine to perform operations comprising:
receiving a search query from a device of a user, wherein the search query is associated with executing a function on an online platform;

performing a search, via the online platform, based on the search query to generate search results;
determining, by a machine learning (ML) model, an intent of the user associated with the search query based on input for the ML model comprising the search query, user profile information associated with the user, and activity information of the user;
generating a prompt based on the search query, the intent of the user, and one or more relationships between the user and one or more entities, wherein generating the prompt further comprises:
  selecting a prompt template from a plurality of prompt templates based on the intent of the user, wherein different intents are associated with different prompt templates, the prompt template including a field for the intent of the user that is different from fields in other prompt templates from the plurality of prompt templates, the prompt template comprising fields for the intent, the search query, and the one or more relationships; and
  filling in the fields in the selected prompt template with the intent, the search query, and the one or more relationships;
feeding as input the prompt and a subset of the search results to a generative artificial intelligence (GAI) model;
receiving a summary from the GAI model in response to the prompt, wherein the summary is based on the intent of the user; and
causing presentation of the summary and one or more of the search results returned by the search on a user interface (UI) of the device of the user.

17. The non-transitory machine-readable storage medium as recited in claim 16, wherein the user activity information comprises at least one of search queries submitted by the user, items posted by the user, interactions with other users, interactions of the user with results of the search queries, or items read in a user feed.

18. The non-transitory machine-readable storage medium as recited in claim 17, wherein the interactions of the users with results of the search queries comprises results selected for obtaining additional details, follow-up searches, and actions taken based on the results.

19. The non-transitory machine-readable storage medium as recited in claim 18, wherein features of the ML model comprise at least one of user skill, user title, user searches, or job post information.

20. The non-transitory machine-readable storage medium as recited in claim 16, wherein training data for the ML model further comprises information of a knowledge graph, the information of the knowledge graph comprising relationship data between users and one between users and entities of the online platform, and a connection degree of the relationship data between.

* * * * *